(No Model.)
C. F. WEST.
PUMP ATTACHMENT FOR WINDMILLS.
No. 512,595. Patented Jan. 9, 1894.
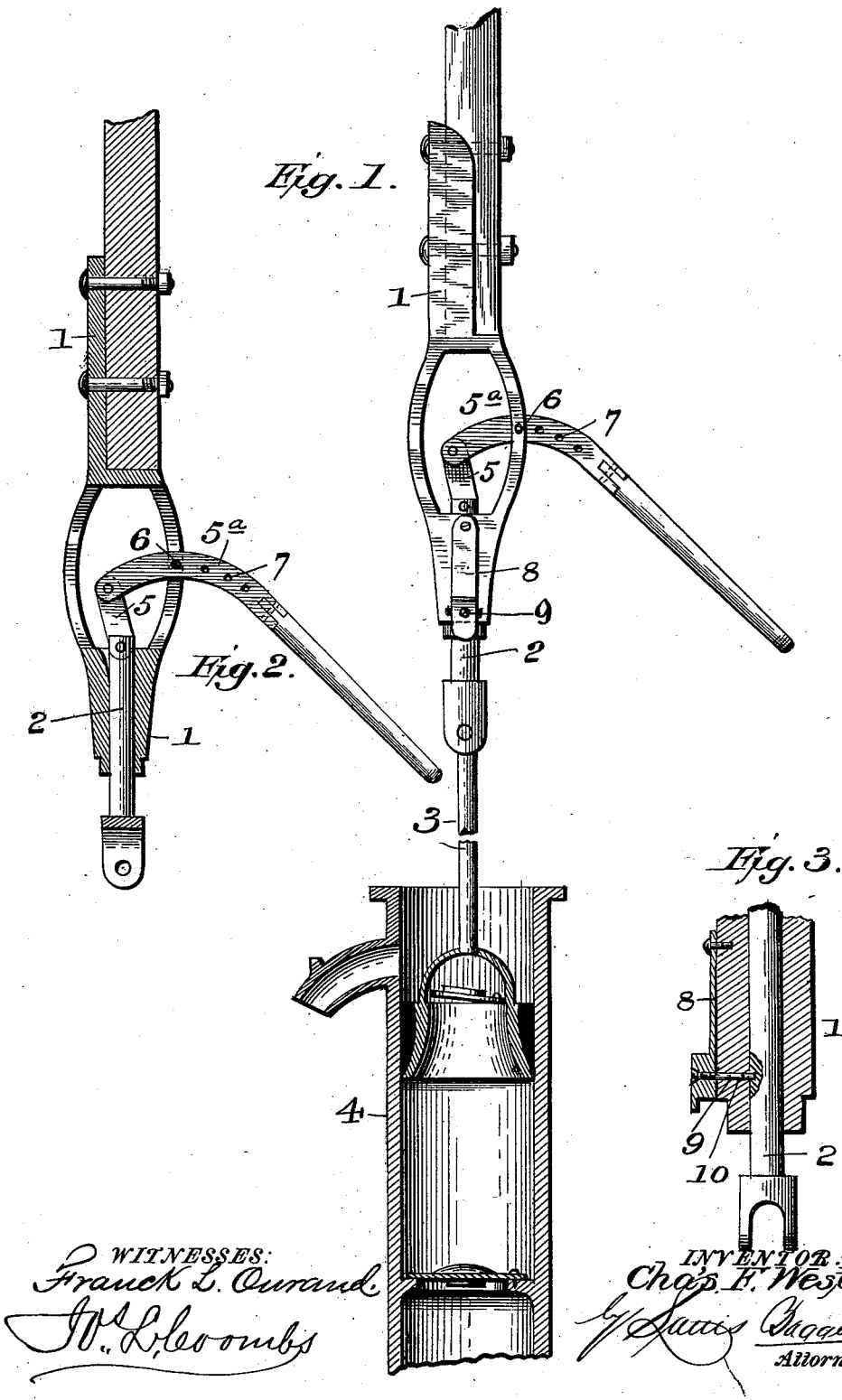

UNITED STATES PATENT OFFICE.

CHARLES F. WEST, OF PIONEER, OHIO.

PUMP ATTACHMENT FOR WINDMILLS.

SPECIFICATION forming part of Letters Patent No. 512,595, dated January 9, 1894.

Application filed January 31, 1893. Serial No. 460,310. (No model.)

*To all whom it may concern:*

Be it known that I, CHARLES F. WEST, a citizen of the United States, and a resident of Pioneer, in the county of Williams and State of Ohio, have invented certain new and useful Improvements in Pumping Attachments for Windmills; and I do hereby declare that the following is a full, clear, and exact description of the invention, which will enable other skilled in the art to which it appertains to make and use the same, reference being had to the accompanying drawings, which form a part of this specification.

My invention relates to improvements in pumping attachments for windmills, the object being to provide novel means for working the sucker-rod by hand when the wind fails, without disconnecting the pump-rod from the sucker-rod.
The invention consists in the novel construction and combination of parts hereinafter fully described and claimed.

In the accompanying drawings: Figure 1 is a side elevation of a pumping attachment constructed in accordance with my invention, showing the same connected with a pump. Fig. 2 is a sectional view of the attachment. Fig. 3 is a detail sectional view.

In the said drawings the reference numeral 1 designates a casing, the upper end of which is adapted to be connected with the pump-rod of a windmill of any ordinary construction. The lower end of this casing is provided with a cylindrical or other bore in which is located a vertically reciprocating rod 2, the lower end of which is connected with the sucker rod 3, of a pump 4.

Connected with the upper end of rod 2, is a link 5, connected with a handle $5^a$, passing through a slot in the casing, and removably pivoted to the casing by a pivot pin 6. This handle is provided with a series of holes 7. By means of this pin and the holes, the handle may be adjusted to shorten or lengthen its stroke. The handle is also made in sections, whereby the outer section may be removed and another section of a different length substituted therefor, when desired.

The casing near its lower end, is provided with a pivoted spring plate 8, having a pin 9 near its lower end which projects through a slot 10, in the casing, and is adapted to engage with a hole or recess in the rod 2.

The operation will be readily understood. When there is sufficient wind to run the windmill, the handle is locked by the pin 9 engaging with the hole in rod 2. As the windwheel rotates the casing will be vertically reciprocated and by reason of rod 2 connected with the sucker-rod being locked as before described, the said sucker-rod will be reciprocated. When the wind fails, however, the pin 9 is disengaged from rod 2, and pushed to one side in the slot 10. The sucker-rod can now be operated by hand, through the medium of handle 1, like an ordinary pump.

Having thus described my invention, what I claim is—

The combination with the casing 1, adapted to be connected with the pump rod of a wind mill having a slot 10 near its lower end, of the vertically reciprocating rod 2, working in the bore of the casing, having a hole or recess, the pivoted adjustable handle $5^a$ carried by said casing, the link 5, connecting the handle and rod 2, the spring plate 8 pivoted to the casing having a pin 9, passing through the slot 10, and engaging with the hole or recess in rod 2, substantially as and for the purpose specified.

In testimony that I claim the foregoing as my own I have hereunto affixed my signature in presence of two witnesses.

CHARLES F. WEST.

Witnesses:
ALBERT S. DOUBLE,
CHARLES GAY.